US010373225B2

(12) United States Patent
Zellner et al.

(10) Patent No.: US 10,373,225 B2
(45) Date of Patent: Aug. 6, 2019

(54) METHOD AND APPARATUS FOR FACILITATING PURCHASE TRANSACTIONS ASSOCIATED WITH A SHOWROOM

(71) Applicants: AT&T Intellectual Property I, LP, Atlanta, GA (US); AT&T Mobility II LLC, Atlanta, GA (US)

(72) Inventors: Sam Zellner, Atlanta, GA (US); Jeffrey Mikan, Atlanta, GA (US); Jeff Pedro, Alpharetta, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 1014 days.

(21) Appl. No.: 14/529,276

(22) Filed: Oct. 31, 2014

(65) Prior Publication Data
US 2016/0125491 A1      May 5, 2016

(51) Int. Cl.
G06Q 30/00       (2012.01)
G06Q 30/06       (2012.01)
G06Q 30/08       (2012.01)
G06Q 50/00       (2012.01)

(52) U.S. Cl.
CPC ......... *G06Q 30/0613* (2013.01); *G06Q 30/08* (2013.01); *G06Q 50/01* (2013.01)

(58) Field of Classification Search
CPC ..................................................... G06Q 30/00
See application file for complete search history.

(56) References Cited

U.S. PATENT DOCUMENTS

| | | | |
|---|---|---|---|
| 7,311,605 B2 | 12/2007 | Moser | |
| 8,219,438 B1 * | 7/2012 | Moon | G06Q 30/0201 705/7.29 |
| 9,082,143 B1 * | 7/2015 | Cleary | G06Q 30/0601 |
| 9,483,789 B1 * | 11/2016 | Hanlon | G06Q 30/0631 |
| 2005/0102185 A1 | 5/2005 | Barker et al. | |
| 2005/0175218 A1 * | 8/2005 | Vertegaal | A61B 3/113 382/103 |
| 2005/0177463 A1 | 8/2005 | Crutchfield et al. | |
| 2006/0200413 A1 * | 9/2006 | Kessel | G06Q 30/02 705/50 |
| 2007/0090185 A1 | 4/2007 | Lewkowitz et al. | |

(Continued)

OTHER PUBLICATIONS

Hopfinger, J. (2014). Brave new retail world. Retail Merchandiser, 54(4), 1(1). S&R Media Corporation. (Jul. 2014-Aug. 2014) (Year: 2014).*

*Primary Examiner* — Abby J Flynn
(74) *Attorney, Agent, or Firm* — Guntin & Gust, PLC; Mark Wilinski

(57) ABSTRACT

Aspects of the subject disclosure may include, for example, monitoring a user in a showroom to generate shopping parameters of the user, determining that the user is seeking to purchase a product in the showroom according to the shopping parameters, obtaining user data of the user in response to the determining that the user is seeking to purchase the product, analyzing the user data, selecting interaction data from among a group of interaction data according to the analyzing of the user data, and providing the interaction data to a computing device of a sales agent to enable the sales agent to transact with the user for the purchase of the product. Other embodiments are disclosed.

20 Claims, 8 Drawing Sheets

(56) References Cited

U.S. PATENT DOCUMENTS

| | | | |
|---|---|---|---|
| 2008/0004951 A1* | 1/2008 | Huang | G06Q 30/02 |
| | | | 705/14.67 |
| 2008/0294607 A1* | 11/2008 | Partovi | G06Q 30/00 |
| 2011/0093339 A1* | 4/2011 | Morton | G06Q 30/02 |
| | | | 705/14.58 |
| 2012/0095805 A1* | 4/2012 | Ghosh | G06Q 30/0201 |
| | | | 705/7.34 |
| 2012/0158482 A1* | 6/2012 | Paradise | G06Q 30/0224 |
| | | | 705/14.25 |
| 2013/0080290 A1 | 3/2013 | Kamm | |
| 2013/0124365 A1 | 5/2013 | Pradeep | |
| 2013/0290145 A1* | 10/2013 | Durst, Jr. | G06Q 30/0629 |
| | | | 705/26.64 |
| 2014/0132728 A1 | 5/2014 | Verano et al. | |
| 2014/0143055 A1* | 5/2014 | Johnson | G06Q 30/0257 |
| | | | 705/14.55 |
| 2014/0208272 A1 | 7/2014 | Vats et al. | |
| 2014/0358666 A1* | 12/2014 | Baghaie | G06Q 30/0267 |
| | | | 705/14.41 |
| 2014/0363059 A1* | 12/2014 | Hurewitz | G06Q 30/0201 |
| | | | 382/118 |
| 2015/0142596 A1* | 5/2015 | Jakobson | G06Q 20/085 |
| | | | 705/24 |
| 2015/0262117 A1* | 9/2015 | Li | G06Q 10/087 |
| | | | 235/385 |

* cited by examiner

100

200

300

METHOD AND APPARATUS FOR FACILITATING PURCHASE TRANSACTIONS ASSOCIATED WITH A SHOWROOM

FIELD OF THE DISCLOSURE

The subject disclosure relates to a method and apparatus for facilitating purchase transactions associated with a showroom.

BACKGROUND

Purchases can be made online or can be made in a store or showroom. Often, users desire to see the product in person before making a purchase. AN inability to see the product can create a lack of confidence in understanding the product during the online purchasing experience. Further, users often desire to review information regarding the product at a time of purchase which can add to the lack of confidence in understanding the product during the showroom purchasing experience.

BRIEF DESCRIPTION OF THE DRAWINGS

Reference will now be made to the accompanying drawings, which are not necessarily drawn to scale, and wherein.

DETAILED DESCRIPTION

Figure 1:
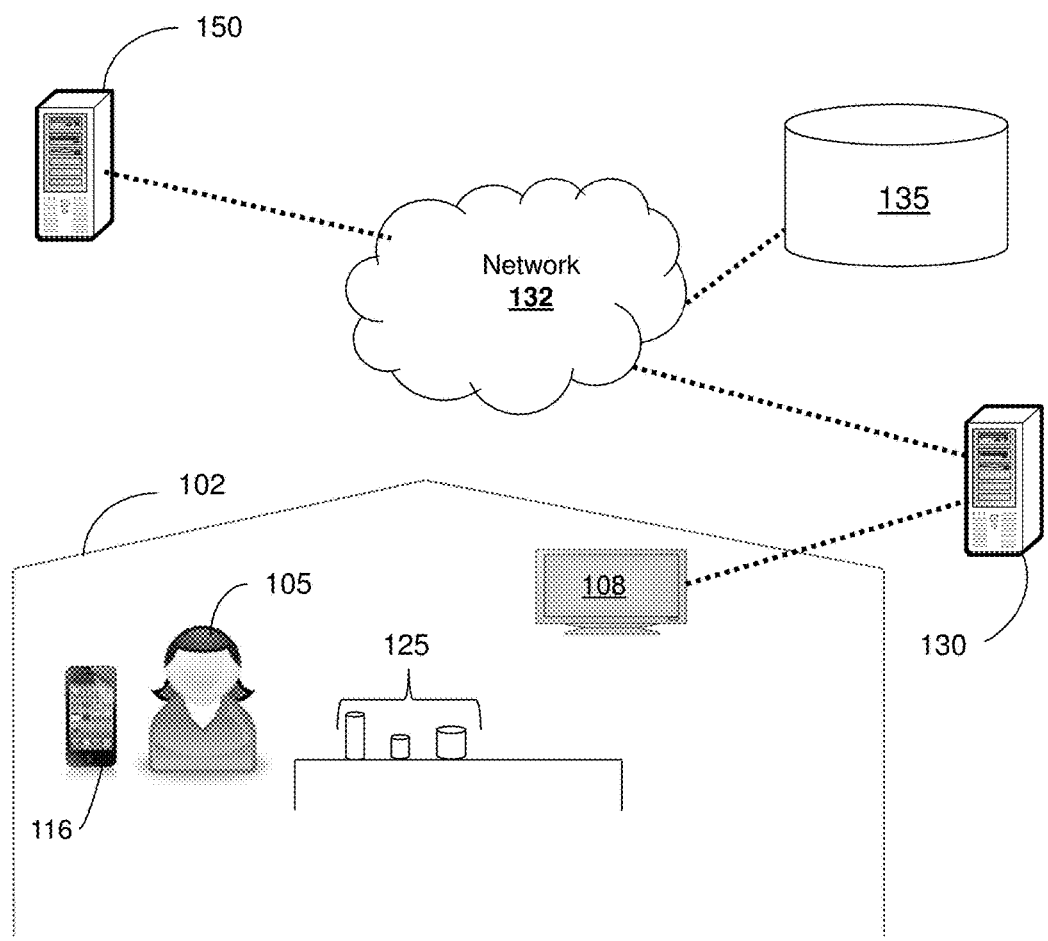
FIG. 1 depicts an illustrative embodiment of a system that guides purchases according to obtaining user data.

The subject disclosure describes, among other things, illustrative embodiments for facilitating or otherwise guiding a purchase transaction. The exemplary embodiments provide for accessing and synthesizing data associated with a user and then guiding interactions with that user according to the data synthesis to facilitate a purchase of a product. The purchase can occur in a showroom or can occur elsewhere such as at a merchant's website.

One or more aspects of the subject disclosure include determining whether a user in a showroom is seeking to purchase a product (i.e., showrooming), obtaining user data if showrooming is occurring, and analyzing the user data to identify or otherwise select interaction data that can be used to facilitate the purchase transaction. In one or more embodiments, the interaction data can be provided to a sales agent (e.g., a human or a virtual agent) so that the sales agent can interact with the user as to a price of a product, alternative products, accessories for the product, bundling of services (and/or other products) for the product. In one or more embodiments, the interaction data can be provided to an online merchant to enable the online merchant to complete a purchase transaction and share revenue with the showroom based on the purchase. In one or more embodiments, monitoring of the user in the showroom can be performed, including location tracking, eye-tracking, and/or device activity tracking, to enable a determination as to whether the user is seeking to purchase a particular product.

In one or more embodiments, a showroom engine, which can be a network device or can be a local device at a showroom, can be used for obtaining user data and facilitating product purchases based on the user data. The showroom engine can be configured into various functional areas such as inputs (e.g., data collection), processing (e.g., arriving and conclusions) and outputs (e.g., broadcasting conclusions). In one embodiment, as inputs into the showroom engine, the engine can collect user data relevant to the purchasing decision. The showroom engine can leverage sensor technologies to discern the likelihood the user is showrooming, such as based on the user's geo-location within the showroom, eye tracking, idleness, and/or active-state of the user's smartphone device. In one embodiment, once the showroom engine discerns the user satisfies a defined threshold as a purchase target (e.g., based on an amount of device activity, location in showroom, eye-tracking correlating to a particular product, and so forth), additional data collection can be performed, such as attributes of the user, what the user is looking at, available stock of the product being considered, and/or other active functions on the smartphone.

In one or more embodiments, the showroom engine can process the data collected and arrive at one or more conclusions, which form or otherwise guide interactions with the user. Business rules driven by combinations of data points can inform opportunities to: suggest similar products, suggest different products, suggest accessories to products, arrive at attractive pricing, and/or suggest bundling offers. The showroom engine can communicate with devices within the showroom in order to provide its conclusions regarding how to interact with the particular user to facilitate a product purchase in the showroom. These interactions can manifest in various forms including: directing human resource support to the user by providing messages to the support staff that includes interaction guidance such as pricing, user background, alternative products, bundling offers, and so forth. Multimedia and signage content adjustments can be tailored to the user. On-demand product fabrication can be performed. The product sale can be completed with the assistance of data obtained by the showroom engine, such as user identification, billing information, delivery information, and so forth.

In one embodiment, if a user is reviewing a product in the showroom, but later purchases the product online, the showroom engine can communicate with the online merchant to facilitate the transaction. For instance, metadata about the showroom experience of the user can be provided to the online merchant so that a compensation for providing the tactile experience may be rendered.

The exemplary embodiments described herein can include one or more components and/or one or more steps described with respect to U.S. application Ser. No. 14/529,630 entitled "Method and Apparatus for Managing Purchase Transactions" with the disclosure of which is hereby incorporated by reference.

One embodiment of the subject disclosure includes monitoring, by a system including a processor, a user in a showroom to generate shopping parameters of the user. The system can determine that the user is seeking to purchase a product in the showroom according to the shopping parameters. The system can obtain user data of the user in response to the determining that the user is seeking to purchase the product. The system can analyze the user data and can select interaction data from among a group of interaction data according to the analyzing of the user data. The system can provide the interaction data to a computing device of a sales agent to enable the sales agent to transact with the user for the purchase of the product.

One embodiment of the subject disclosure includes a device having a processor and a memory that stores executable instructions that, when executed by the processor, facilitate performance of operations, including determining that a user is seeking to purchase a product in a showroom according to monitoring of the user in the showroom. The processor can obtain user data of the user in response to the determining that the user is seeking to purchase the product. The processor can analyze the user data and can select interaction data from among a group of interaction data according to the analyzing of the user data. The processor can determine that the user has not purchased the product in the showroom and can provide the interaction data to a computing device of a sales agent to enable the sales agent to transact with the user for the purchase of the product. The sales agent can be an online entity that sells the product, and the providing of the interaction data to the computing device of the sales agent can be responsive to the determining that the user has not purchased the product in the showroom.

One embodiment of the subject disclosure includes a machine-readable storage device, comprising executable instructions that, when executed by a processor, facilitate performance of operations, including determining that a user is seeking to purchase a product in a showroom according to monitoring of the user in the showroom. The processor can obtain user data of the user in response to the determining that the user is seeking to purchase the product. The processor can analyze the user data and can select interaction data from among a group of interaction data according to the analyzing of the user data. The processor can provide the interaction data to a display device of the showroom to cause the display device to present an advertisement associated with the interaction data.

FIG. 1 depicts an illustrative embodiment of a system 100 that includes a showroom 102. Showroom 102 can be any location that allows users (one of which is illustrated as user 105) to view or otherwise access products 125, such as a store, a car dealership, and so forth. Showroom 102 is illustrated as a physical show in FIG. 1, however, in one or more embodiments, the showroom can be located in a virtual environment, such as a virtual store located in a virtual world.

The type of product 125 can vary including electronic products (e.g., a mobile phone, a tablet, a television, software, a home appliance, and so forth) and non-electronic products (e.g., tools, furniture, consumer goods, perishable items including food, and so forth). Products 125 can also include service(s) that can be purchased with or without purchasing a physical product.

System 100 can include a server 130 associated with the showroom 102. The server 130 can be located at the showroom 102 or can be located elsewhere, such as in a distributed hardware environment. A single server 130 is illustrated but any number of servers can be utilized in association with any number of showrooms 102. In one or more embodiments, the server 130 can perform a number of functions to facilitate purchasing of product(s) by the user 105. For instance, the server 130 can determine whether a user is seeking (e.g., has an interest) to purchase a product 125 in the showroom 102. For example, the server 130 can monitor the showroom 102, including one or more of identifying a location of the user 105 in the showroom such as in proximity to a particular product 125. The monitoring can also include detecting an activity state of a communication device 116 of the user 105. In one embodiment, the server 130 can determine particular activities occurring at the communication device 116 that is indicative of not seeking to purchase a product in the showroom 102, such as an active gaming session of the communication device 116 which would indicate that the user is not looking at products but is rather playing a video game. In another embodiment, other activities can be detected (e.g., via polling from the server 130 to the communication device 116) that are indicative of seeking to purchase a product 125, such as a communication session of the communication device 116 with a content source (e.g., a content download) that is related to the product, including viewing a consumer reports website for a particular product 125 that the user is in proximity to in the showroom 102. For example, the server 130 can request and obtain a list of recently accessed websites from the communication device 116. More specific information can also be requested by the server 130 of the communication device 116, including recent searches via a search engine accessed by the communication device.

In another embodiment, the server 130 can perform eye-tracking of the user 105 to determine whether the user is seeking to purchase a particular product 125. The eye-tracking can be performed using various techniques including capturing images of the eye of the user 105 and performing image pattern recognition on the images to determine a viewing angle of the user. The server 130 can be coupled with or in communication with various other components for monitoring the user 105 in the showroom 102, such as video cameras.

In one embodiment, the eye-tracking can be an optical method for measuring eye motion where light, such as infrared, is reflected from the eye and sensed by a video camera or another optical sensor. Eye rotation can be determined from changes in the reflections. For example, a video-based eye tracker can be used based on corneal reflection and the center of the pupil being tracked over time. Other eye-trackers can also be utilized such as a dual-Purkinje eye tracker, which uses reflections from the front of the cornea and the back of the lens.

In one embodiment, the server 130 can obtain user data of the user 105 in response to determining that the user is seeking to purchase the product (e.g., based on the techniques described herein including showroom location, eye-tracking, device activity, and so forth). The obtaining of the user data can include identifying the user 105, such as based on communications with the communication device 116 of the user, image pattern recognition of images captured of the user and/or other identification techniques. The user data can be of various types including user preferences (e.g., according to user input such as in a user profile that is accessed by the server 130 via a request provided to the communication device 116), a transaction history of the user (such as obtained from records of the showroom, records of other showrooms, or from other sales sources), a media consumption history of the user (such as obtained from a service provider of the user), demographics of the user, or a combination thereof. The obtaining of the user data can be performed in conjunction with authorization received from the user, such as a user that permits the server 130 to obtain this data whenever the user is seeking to purchase a product 125 at the showroom 102. For example, the communication device 116 can present a permission request according to a message sent from the server 130 when the server is seeking to access user data of the user. In one embodiment, the user data can be obtained over a network 132 from various sources including a database 135. The sources can be managed by the same entity managing the server 130 and/or can be managed by other entities that are different from the entity managing the server 130.

In one embodiment, the server 130 can analyze the user data and can select interaction data from among a group of interaction data according to the analysis. The interaction data can be information that guides interaction with the user, including interaction between the user and human sales agents, interaction between the user and other computing devices, and/or interaction between the user and an online merchant website. The group of interaction data can be stored locally by the server 130 or remotely, such as at database 135. The interaction data can be a customized guide for facilitating a sale to the user 105.

In one embodiment, the interaction data can be information that is provided to a sales agent at the showroom 102, such as transmitting the information from the server 130 to a communication device of the sales agent. The information can be of various types, such as one or more of suggested pricing for the product 125, alternative products that are similar or dissimilar to the product 125, an accessory that can be used with the product, and other services (which may or may not be provided by the manufacturer of the product) that can be bundled or otherwise utilized with the product. As an example, the product 125 can be a television and the interaction data can include a suggested price for the television, as well as On-Demand Services that can be purchased with the television.

In one embodiment, the product 125 can be adjusted according to the interaction data. For example, the interaction data can indicate that the user has a preference for particular software on a mobile phone. The product 125 can be adjusted (e.g., automatically by the server 130 without user intervention via adjustment signals sent from the server to a communications receiver of the product and/or by the sales agent or another individual) so that it includes the particular software to allow the user 105 to see how the software functions on the product while in the showroom 102. The adjustment of the product 125 is not limited to software and can include adjusting physical features of the product 125 according to the interaction data, such as a sales agent providing a heavy-duty case for an electronic product where the interaction data indicates that the user utilizes the electronic product in rough environments.

In one embodiment, signs or advertisements can be adjusted according to the interaction data. For example, a display device 108 of the showroom 102 (such as a display in proximity to a detected location of the user 105) can present an advertisement associated with the interaction data, including information about the product 125, information about alternative products, reviews of the product, and so forth. This presentation by the display device can be based on the server 130 providing the interaction data to the display device 108. In one embodiment, the showroom 102 can have multiple display devices 108 and the server 130 can customize presentations at each of the display devices according to users in proximity to the particular display device. In one embodiment, the server 130 can detect an activity state of the communication device 116 via polling of the communication device or other monitoring techniques whereby the user 105 is viewing a negative consumer review of the product 125. The interaction data can cause the display device 108 to present a positive consumer review of the product 125 or provide other information that shows why the negative consumer review is inaccurate or incomplete.

In one embodiment, the server 130 can determine that the user 105 has not purchased the product 125 in the showroom 102. The interaction data can be provided to a computing device 150 of an online entity (which may be a different entity than manages the server 130 or can be the same entity) to enable or otherwise facilitate transacting with the user 105 for the purchase of the product 125. In one embodiment, the server 130 can determine that the user 105 has purchased the product 125 from the online entity and can engage in revenue sharing with the online entity according to a purchase transaction for the product. In this example, the showroom 102 can be managed by a first entity that is different from the online entity. In one embodiment, the server 130 can provide metadata to the online entity which describes an interaction of the user 105 at the showroom 102 associated with the product 125. The described interaction can include a description of accessories that were viewed, alternative products that were viewed, service bundles that were viewed, suggested prices that were discussed, and so forth.

Figure 2:
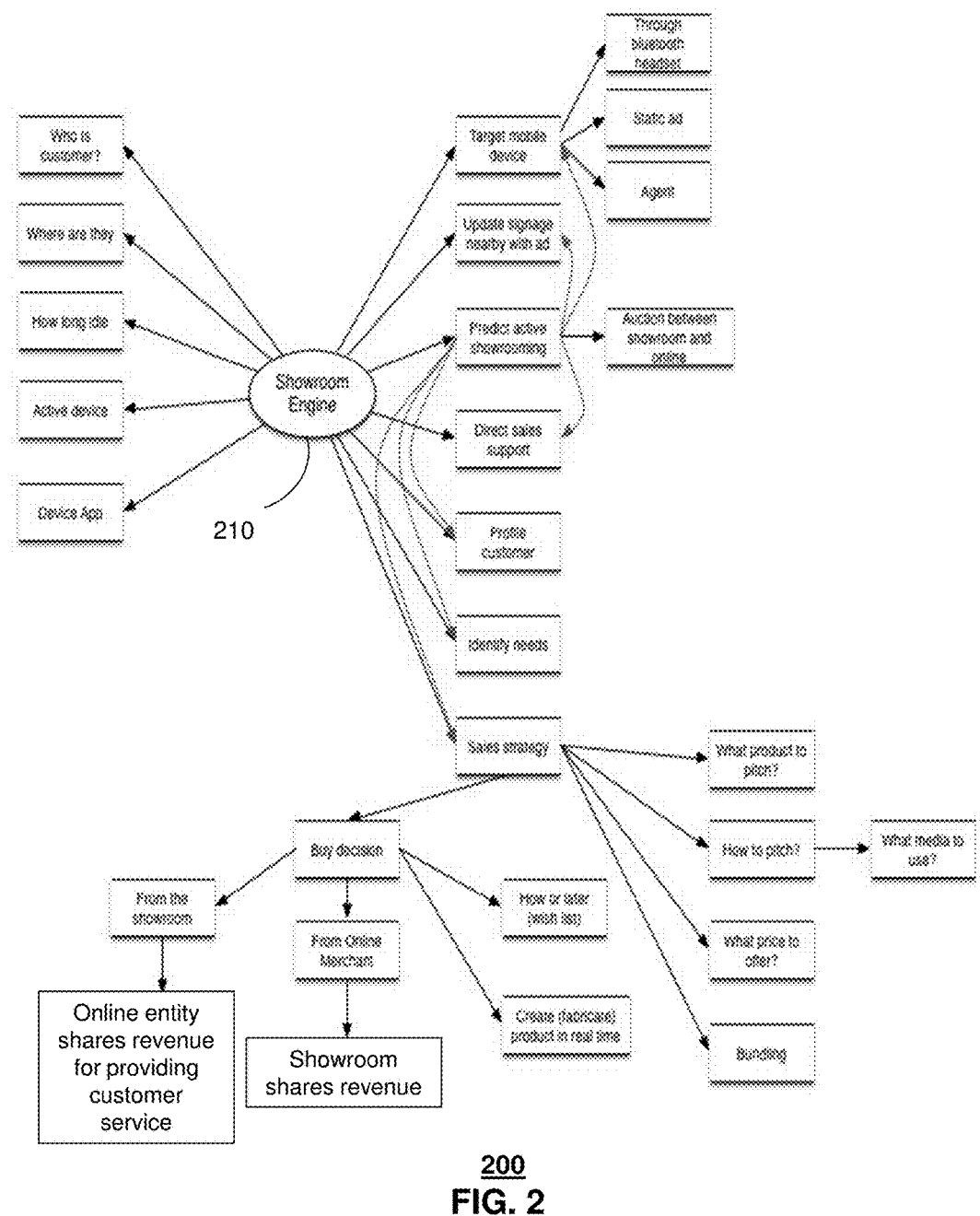
FIG. 2 depicts an illustrative embodiment of data flow for the system of FIG. 3.
Figure 3:
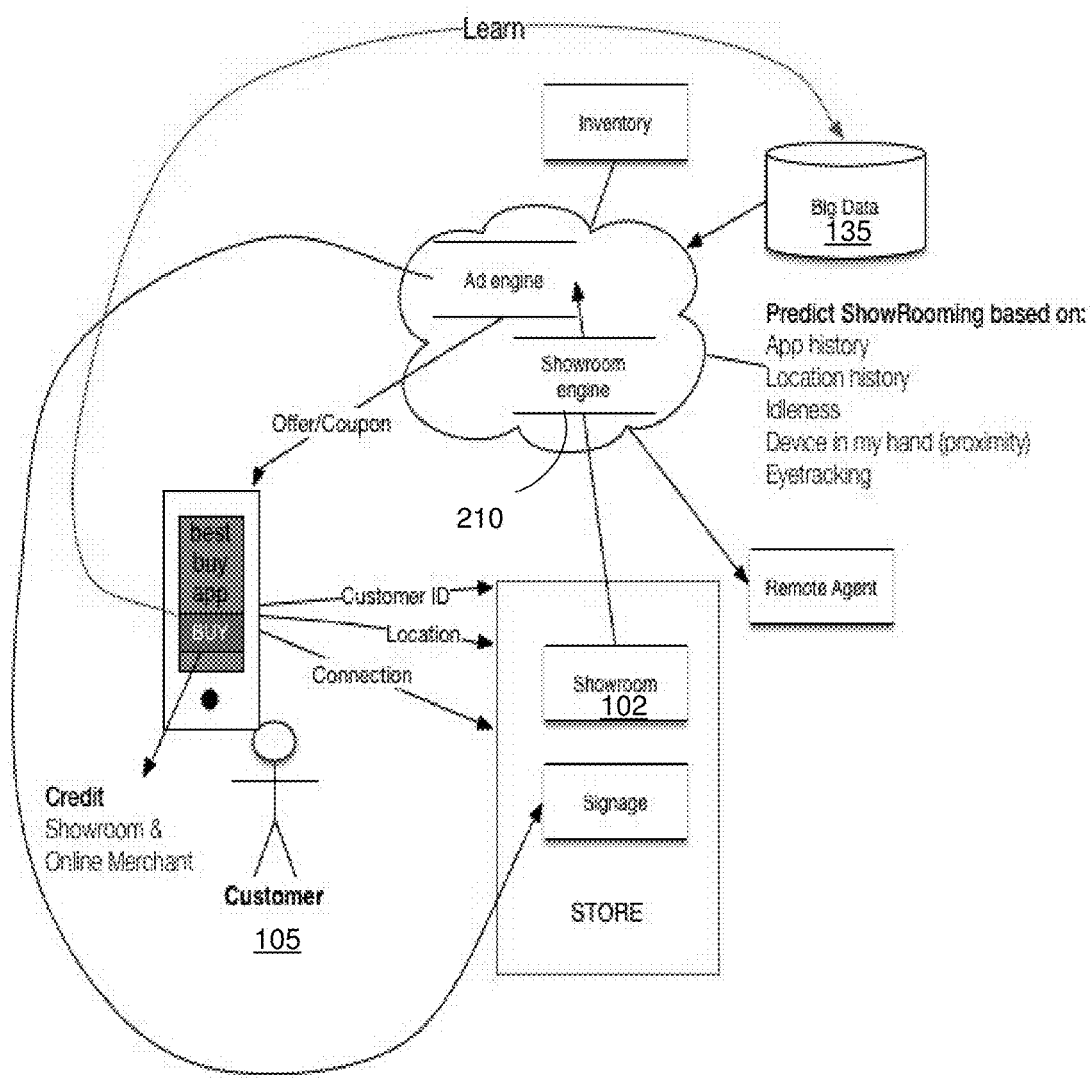
FIG. 3 depicts another illustrative embodiment of a system that guides purchases according to obtaining user data.
Figure 4:
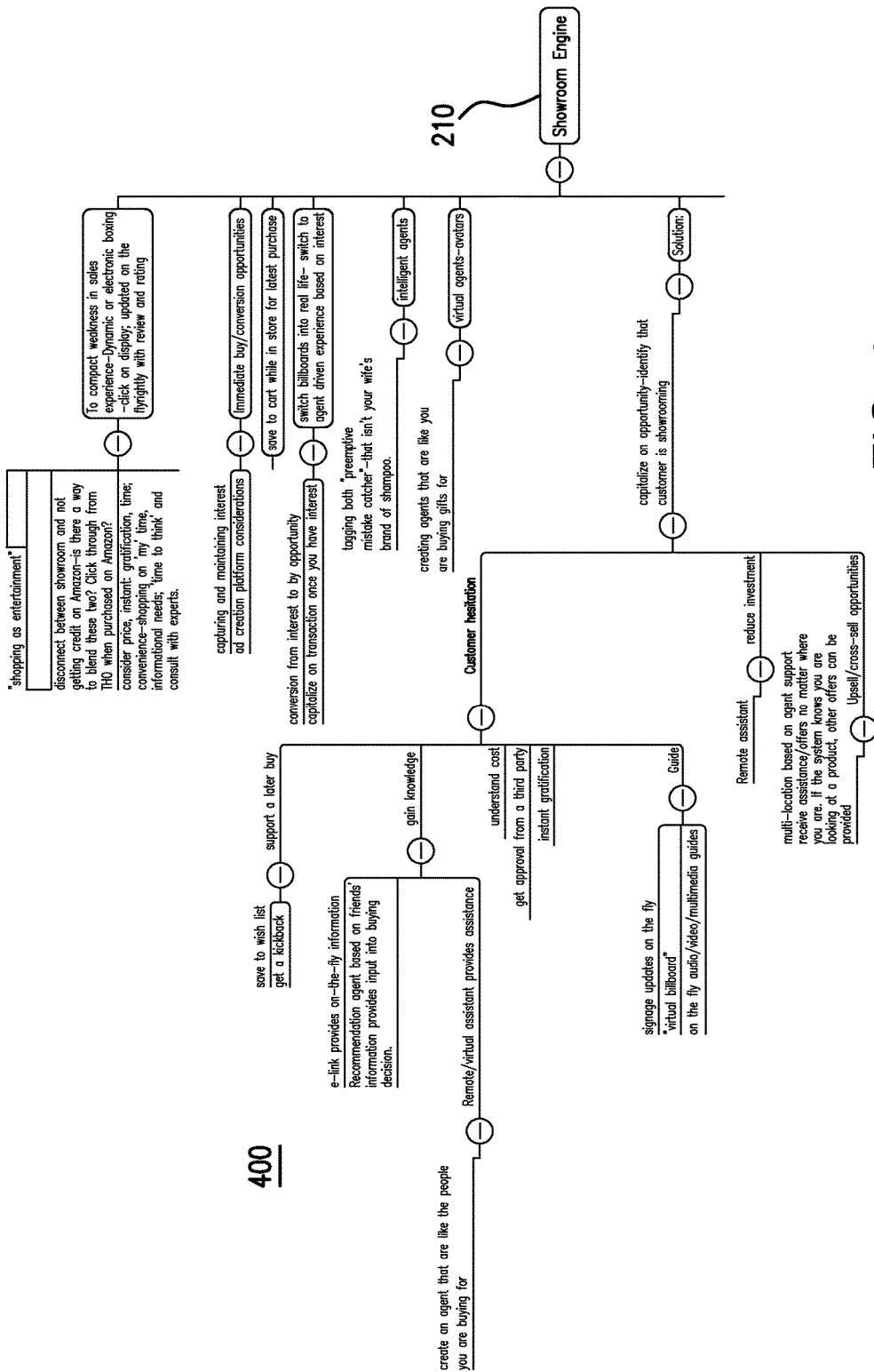
FIG. 4 depicts another illustrative embodiment of data flow for the system of FIG. 3.

Referring to FIGS. 2-4, data flows 200 and 400 are illustrated for a system 300. System 300 can include one or more features of system 100. A showroom engine 210 is illustrated that can provide knowledge, interaction to social networks, and/or an interface to bots. The bots can be executed on one or more devices of the user or other users and can be used for providing the showroom engine 210 with user data that can be analyzed to facilitate the purchase transaction by the user of a product.

System 300 provides for the showroom engine 210 detecting when a user in a showroom is seeking to purchase a product, obtaining user data in response to the detection, analyzing the user data, and selecting interaction data based on the analysis which can assist in completing a purchase transaction of a product. The interaction data can be of various forms such as a selection of a particular advertisement to be presented by a display device in the showroom that is in proximity to the user to further encourage the user to purchase a product. The interaction data can be a history of negotiations with the user which is then forwarded to an online merchant so that the online merchant can later complete a sale of the product with the user. The interaction data can be useful information concerning the product, which is helpful to the user in determining whether to complete the purchase transaction.

The showroom engine 210 can include numerous outputs which enable merchandising execution of products available for purchase based upon users in the store, solving for immediacy—executing the sale right then, reduction in investment, capitalizing on opportunity, and so forth. User hesitation can be addressed by the showroom engine 210 utilizing immediate access to product knowledge, cost of product, and/or approval from a party (e.g., social approval indicated by reviews or likes in a social network website).

The showroom engine 210 can provide value to the retailer and to the user by taking inputs and generating relevant information to facilitate a product purchase. The showroom engine 210 can identify that someone is showrooming in the store, can determine what product the user is looking for, and can perform a broadcast relevant to that product to provide more information and to encourage the purchase. The showroom engine 210 can be portable to brick & mortar stores and online shopping experiences.

In one embodiment, the showroom engine 210 can obtain attributes of a user, determine what the user is looking at (what and where), determine what the store has available to sell the user, determine idle time while walking aisle of products (e.g., utilized as a showrooming predictor), determine if user is active on a communication device (e.g., a smart phone), determine what activities are being executed on the communication device.

The showroom engine 210 can predict showrooming from inputs, profile the user, identify the needs or interests of the user, determine a sales strategy to meet or otherwise satisfy the needs/interests and user profile, determine products to pitch, determine how to pitch the products (e.g., target devices such as mobile devices, static advertisement, utilize a human sales agent, provide user with pith via a Bluetooth® or other short-range wireless headset). Based on the various obtained information, the showroom engine 210 can determine product pricing to offer to the user. The showroom engine 210 can also utilize the various obtained information to determine products which can be bundled, including services to be bundled with products.

In one or more embodiments, the showroom engine 210 can provide guidance or direction to sales support (e.g., human agents or virtual agents), including suggested prices, suggested accessories, alternative products, bundling or products/services, and so forth. The showroom engine 210 can enable delivering a sales offer tailored to the user.

For example, media can be leveraged for customizing to the user, including updating signage (e.g., a display device or an electronic display) according to the sales offer. In one embodiment, a buy decision on behalf of the user can be detected or otherwise determined. If the purchase is from an online merchant, the showroom 102 can share in revenue of the purchase. If the purchase is from the showroom 102, then the online merchant (which provided online user service) can share in the revenue of the purchase. In one embodiment, the user can add the product to a wish list. In another embodiment, information sharing between the showroom 102 and the online merchant can be performed, including sharing product data, social network data, ranking data, and so forth. The showroom engine 210 can enable on-demand product production or fabrication which is customized to the user, such as while the user is in the showroom 102.

Showroom engine 210 can detect a user that is showrooming (e.g., seeking to purchase a product or interested in a product). The showroom engine 210 can predict or otherwise determine which product or products the user is interested in. The showroom engine 210 can make recommendations regarding the product, accessories for the product, alternative products, services associated with the product, bundles or products or services that are available, and so forth. These recommendations can be provided to a human sales agent and/or a virtual sales agent to guide interactions with the user. The user can purchase the product at the showroom or can purchase the product elsewhere (e.g., from an online merchant) with the assistance of information collected during the user's visit to the showroom. Revenue sharing can be performed between the showroom engine 210 and another entity that facilitated the purchase, such as where the user initially looked up the product at a website but then came to the showroom of a different entity to purchase the product.

In another embodiment, the showroom(s) 102, the online merchant(s) 150 and/or other merchant(s) can engage in an auction to sell the product to the user, such as a reverse auction. For example, a selection of auction participants can be made for an auction of a product that the user desires to purchase (e.g., a product that was being showroomed by the user). The selection of the participants can be by the user, by the showroom engine 210, and/or by another entity.

In one embodiment, auction participants can submit offers to sell the product to the user and the lowest offer can be selected by the user. In another embodiment, the auction can be of similar products offered by different sellers. In this example, the lowest price may not be the winning bid, such as where a particular model of the product is considered to be more valuable by the user. In one embodiment, the showroom engine 210 can moderate or otherwise manage the auction, which can be an online auction. For example, the showroom engine 210 can establish a communication session with the user 105 (e.g., via the users device 116), as well as with other merchants (e.g., via online merchant servers 150). The auction can be held and the user 105 can accept a desired offer from one of the seller participants.

The auction can occur at various times, such as while the user 105 is in the showroom 102 or later when the user is elsewhere such as at home. In one embodiment, the showroom engine 210 can provide user data or a portion thereof to the auction participants to assist them in determining offers to be made during the auction. In another embodiment, the showroom engine 210 can receive revenue sharing from the winner of the auction.

In one or more embodiments, the showroom engine 210 can learn from the interaction with the user and use the learned data to facilitate subsequent purchases of products. In one embodiment, the learned data can be images and/or audio captured during the interaction. In another embodiment, the learned data can be other products viewed by the user. As an example, negotiation information such as a user's bid for a product, can be stored (e.g., in database 135) so that subsequent negotiations are adjusted based on historical bid data of the user. In one or more embodiments, monitoring of the user and obtaining of user data can be utilized by an advertisement engine to generate or otherwise adjust advertisements that are presented to the user. For example, the advertisements can be presented by a display device or an electronic sign in proximity to the user. In another embodiment, the advertisement can be presented on a product that the user is presently viewing. For example, a user can be looking to purchase a smart phone and can be testing its functions. During the testing in the showroom, the showroom engine 210 can provide targeted advertising via the smart phone. The targeted advertising can include positive reviews of the smart phone, accessories for the smart phone, services that can be bundled with the smart phone, and so forth.

In one embodiment, the showroom engine 210 can detect an identity of a user and a location of the user in the showroom. This information can be used for determining whether the user is seeking to purchaser a product and determining an identity of the product. Other information can also be utilized in these determinations, such as an activity state of a communication device of the user, recent media consumption of the user (e.g., visiting a consumer reports website regarding a particular product or watching a movie where a particular product is prominent in the movie (e.g., a particular type of boat or car). The showroom engine 210 can perform other types of monitoring of the user, such as beacon, location, idleness, eye tracking, device-in-hand, and so forth. In one embodiment, the showroom engine 210 can access an inventory management system associated with the showroom to determine product availability.

In one embodiment, the showroom engine 210 can generate a virtual sales agent according to user data obtained for a user. The virtual sales agent can be based on the user or can be based on a person for whom the user is seeking to purchase the product. As an example, the showroom engine can detect that the user is seeking to purchase a television for the user's husband. This detection can be based on an analysis of various user data including knowledge of family birthdays, recent website visits by the user, and so forth. The showroom engine 210 can generate a virtual agent with characteristics similar to the user's husband. The characteristics can be determined based on obtained user data for the user's husband, such as monitored media consumption, purchasing history, user preferences, and so forth.

Figure 5:
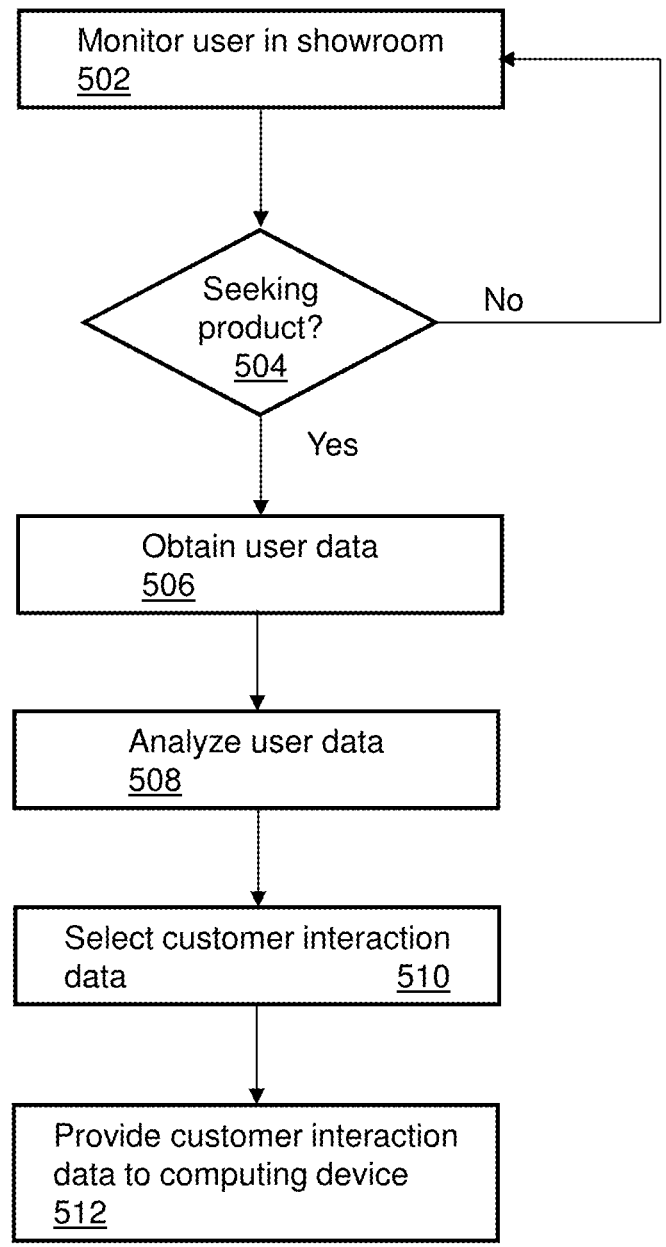
FIG. 5 depicts an illustrative embodiment of a method used in portions of the systems described in FIGS. 1 and 3.

FIG. 5 depicts an illustrative embodiment of a method 500 used by one or both of systems 100 and 300. Method 500 can begin at 502 where monitoring of a user in a showroom is performed to generate shopping parameters of the user. At 504, a determination can be made as to whether the user is seeking to purchase a product (i.e., showrooming) in the showroom according to the shopping parameters. If the user is showrooming then at 506, user data of the user can be obtained. At 508, the user data can be analyzed. At 510, interaction data can be selected from among a group of interaction data according to the analyzing of the user data.

At 512, the interaction data can be provided to a computing device of a sales agent to enable the sales agent to transact with the user for the purchase of the product. The sales agent can be of various types, including a human sales agent in the showroom, a virtual sales agent in the showroom, an online sales agent at a website that sells the product, and so forth. In one embodiment, the shopping parameters can include an activity state of a communication device of the user. In one embodiment, the interaction data can include a price for the product, identification of an alternative product, identification of an accessory for the product, or a combination thereof.

In one embodiment, the interaction data can be provided to a display device of the showroom to cause the display device to present an advertisement associated with the interaction data. In one embodiment, the shopping parameters can include a location of the user in the showroom, eye-tracking data of the user in the showroom, or a combination thereof. In one embodiment, other preferences associated with other users can be determined, such as where the other users and the user are part of an online social network, and where the selecting of the interaction data is based on the other preferences. In one embodiment, a determination can be made that the user has not purchased the product in the showroom, where the sales agent is an online entity that sells the product, and where the providing of the interaction data to the computing device of the sales agent is responsive to the determining that the user has not purchased the product in the showroom.

In one embodiment, the providing of the interaction data to the computing device of the sales agent includes providing metadata that describes an interaction of the user at the showroom associated with the product. In one embodiment, a determination can be made that the user has purchased the product from the online entity and engaging in revenue sharing with the online entity according to a purchase transaction for the product. In one embodiment, the product can be adjusted to generate an adjusted product according to the interaction data.

In one embodiment, the user data can include user preferences according to user input, a transaction history of the user, a media consumption history of the user, demographics of the user, or a combination thereof. In one embodiment, the providing of the interaction data to the computing device of the sales agent can include providing bundling offers that describe services associated with the product, where the services are provided by different third parties.

Figure 6:
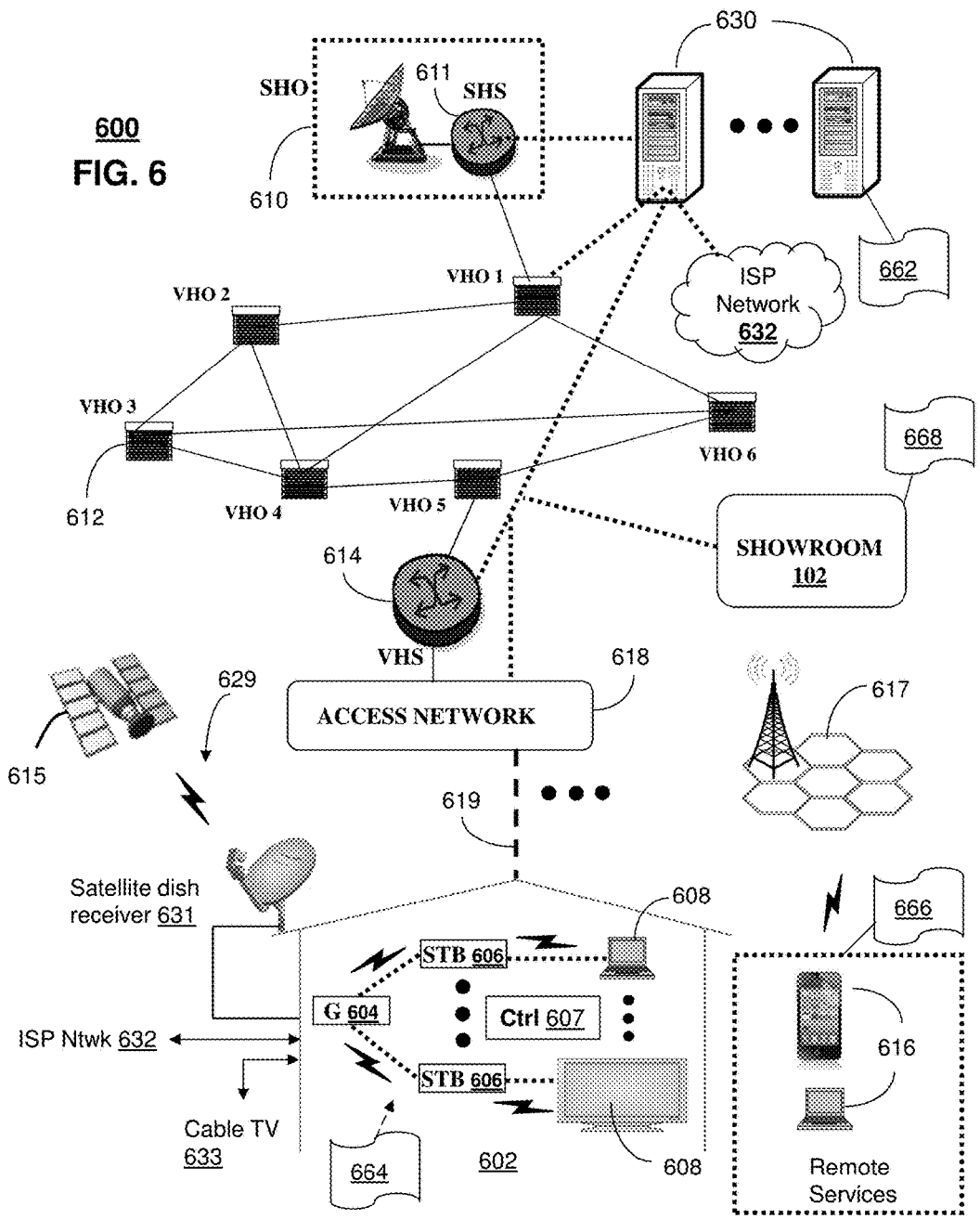
FIG. 6 depicts an illustrative embodiment of a communication system that provides media services and facilitates product and service purchases.

FIG. 6 depicts an illustrative embodiment of a communication system 600 for providing communication services that include facilitating purchases or products and services, as well as enabling voice, video, data and messaging services. The communication system 600 can represent an Internet Protocol Television (IPTV) media system. Communication system 600 can be overlaid or operably coupled with the devices and systems of FIGS. 1-4 as another representative embodiment of communication system 600. For instance, one or more devices illustrated in the communication system 600 of FIG. 6 can enable monitoring of a user in a showroom to generate shopping parameters of the user (e.g., by location tracking, eye-tracking, and/or device activity state tracking), determining that the user is seeking to purchase a product in the showroom according to the shopping parameters, obtaining user data of the user in response to the determining that the user is seeking to purchase the product, analyzing the user data, selecting interaction data from among a group of interaction data according to the analyzing of the user data, and providing the interaction data to a computing device of a sales agent to enable the sales agent to transact with the user for the purchase of the product. The interaction data can enable various functions to be performed including adjusting information presented at display devices in proximity to the user, providing metadata describing user interaction to an online service that sells the product, guiding human and/or virtual agents with respect to a sale of the product, such as pricing, alternative products, bundling of other products or services, accessories, and so forth.

The IPTV media system can include a super head-end office (SHO) 610 with at least one super headend office server (SHS) 611 which receives media content from satellite and/or terrestrial communication systems. In the present context, media content can represent, for example, audio content, moving image content such as 2D or 3D videos, video games, virtual reality content, still image content, and combinations thereof. The SHS server 611 can forward packets associated with the media content to one or more video head-end servers (VHS) 614 via a network of video head-end offices (VHO) 612 according to a multicast communication protocol.

The VHS 614 can distribute multimedia broadcast content via an access network 618 to commercial and/or residential buildings 602 housing a gateway 604 (such as a residential or commercial gateway). The access network 618 can represent a group of digital subscriber line access multiplexers (DSLAMs) located in a central office or a service area interface that provide broadband services over fiber optical links or copper twisted pairs 619 to buildings 602. The gateway 604 can use communication technology to distribute broadcast signals to media processors 606 such as Set-Top Boxes (STBs) which in turn present broadcast channels to media devices 608 such as computers or television sets managed in some instances by a media controller 607 (such as an infrared or RF remote controller).

The gateway 604, the media processors 606, and media devices 608 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 606 and subsystems of the IPTV media system for services such as video-on-demand (VoD), browsing an electronic programming guide (EPG), or other infrastructure services.

A satellite broadcast television system 629 can be used in the media system of FIG. 6. The satellite broadcast television system can be overlaid, operably coupled with, or replace the IPTV system as another representative embodiment of communication system 600. In this embodiment, signals transmitted by a satellite 615 that include media content can be received by a satellite dish receiver 631 coupled to the building 602. Modulated signals received by the satellite dish receiver 631 can be transferred to the media processors 606 for demodulating, decoding, encoding, and/or distributing broadcast channels to the media devices 608. The media processors 606 can be equipped with a broadband port to an Internet Service Provider (ISP) network 632 to enable interactive services such as VoD and EPG as described above.

In yet another embodiment, an analog or digital cable broadcast distribution system such as cable TV system 633 can be overlaid, operably coupled with, or replace the IPTV system and/or the satellite TV system as another representative embodiment of communication system 600. In this embodiment, the cable TV system 633 can also provide Internet, telephony, and interactive media services.

The subject disclosure can apply to other present or next generation over-the-air and/or landline media content services system.

Some of the network elements of the IPTV media system can be coupled to one or more computing devices 630, a portion of which can operate as a web server for providing web portal services over the ISP network 632 to wireline media devices 608 or wireless communication devices 616.

Communication system 600 can also provide for all or a portion of the computing devices 630 to function as a showroom engine (herein referred to as server 630). The server 630 can perform one or more of the functions described with respect to showroom engine 210 or server 130 of FIGS. 1-4. The server 630 can use computing and communication technology to perform function 662, which can include among other things, determining that a user is seeking to purchase a product in a showroom according to monitoring of the user in the showroom, obtaining user data of the user in response to the determining that the user is seeking to purchase the product, analyzing the user data, selecting interaction data from among a group of interaction data according to the analyzing of the user data, determining that the user has not purchased the product in the showroom, and providing the interaction data to a computing device of a sales agent to enable the sales agent to transact with the user for the purchase of the product. In one embodiment, the sales agent can be an online entity that sells the product, and the providing of the interaction data to the computing device of the sales agent can be responsive to the determining that the user has not purchased the product in the showroom.

In another embodiment, the media processors 606 and wireless communication devices 616 can be provisioned with software functions 664 and 666, respectively, to utilize the services of server 630. For instance, functions 664 and 666 of media processors 606 and wireless communication devices 616 enable user data to be collected and analyzed by the server 630. For instance, a device activity state of the communication device 616 can be transmitted to the server 630 to facilitate a determination as to whether the user is showrooming in the showroom 102. As another example, media consumption data can be monitored for a user (e.g., at the user's residence) and this data (or a portion thereof depending on permissions provided by the user) can be provided to the server 630 for analysis to determine interaction data for the user when the user is in the showroom seeking to purchase a product. In one embodiment, the showroom 102 can have one or more components that perform function 668 for monitoring of the user in the showroom. For instance, function 668 can enable location tracking of the user to determine what product the user may be looking at. Function 668 can also enable device activity state tracking, as well as eye-tracking of the user to see what product the user is looking at.

Multiple forms of media services can be offered to media devices over landline technologies such as those described above. Additionally, media services can be offered to media devices by way of a wireless access base station 617 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 7:
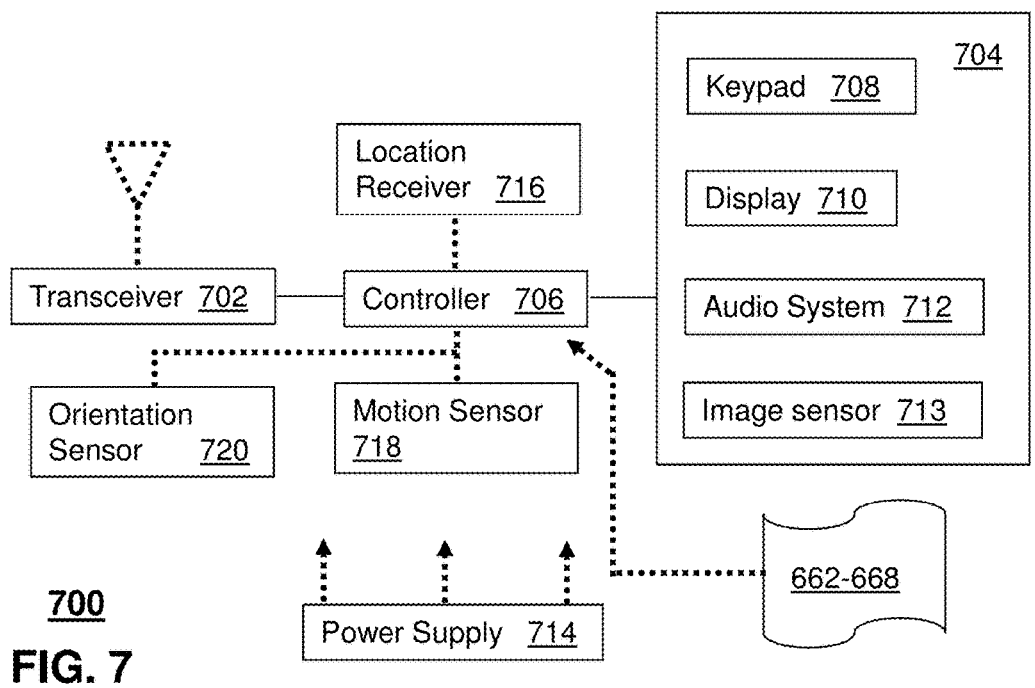
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1-4 and 6 and can be configured to perform portions of method 500 of FIG. 5. Communication device 700 can perform a number of operations including determining that a user is seeking to purchase a product in a showroom according to monitoring of the user in the showroom, obtaining user data of the user in response to the determining that the user is seeking to purchase the product, analyzing the user data, selecting interaction data from among a group of interaction data according to the analyzing of the user data, and providing the interaction data to a display device of the showroom to cause the display device to present an advertisement associated with the interaction data. In one embodiment, the communication device 700 can determine that the user has not purchased the product in the showroom and can provide the interaction data to a computing device of a sales agent to enable the sales agent to transact with the user for the purchase of the product. In this example, the sales agent is an online entity that sells the product, and the providing of the interaction data to the computing device of the sales agent can be responsive to the determining that the user has not purchased the product in the showroom. In one embodiment, the user data can include user preferences according to user input, a transaction history of the user, a media consumption history of the user, demographics of the user, or a combination thereof.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of the devices of FIGS. 1-4 and/or 6, such as the server 130, the database 135, the computing device 150, the showroom engine 210, and so forth. In addition, the controller 706 can be adapted in various embodiments to perform the functions 662-666, respectively.

Upon reviewing the aforementioned embodiments, it would be evident to an artisan with ordinary skill in the art that said embodiments can be modified, reduced, or enhanced without departing from the scope of the claims described below. For example, the interaction data can provide a sales agent (e.g., human or virtual) with competitor pricing for the same product. In one embodiment, access to user data can be limited to only after a determination is made that the user is seeking to purchase a particular product. In another embodiment, access to the user data can be based responsive to identifying the presence of the user in the showroom. In on embodiment, purchases by individuals in a social network of the user of similar products (at the showroom or elsewhere) can be detected so that the sales agent (e.g., human or virtual) can present this information to the user. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
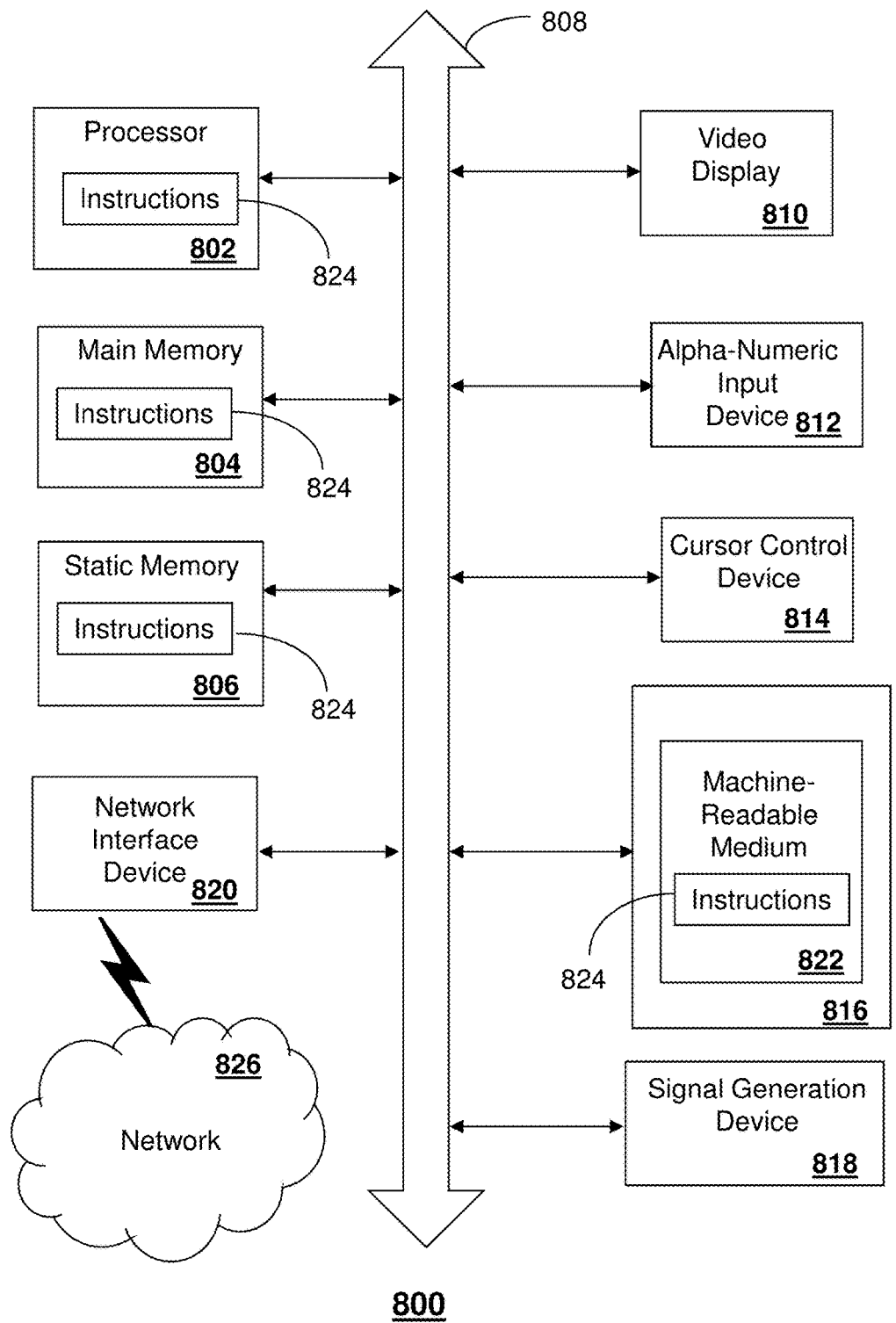
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the server 130 or the showroom engine 210 to facilitate a purchase of a product by a user. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A method comprising:
monitoring, by a processing system including a processor, a user in a showroom to generate shopping parameters of the user, wherein the monitoring further comprises:
capturing, by the processing system, image data of the user in the showroom, the image data that is captured including an eye image and another image of the user; and
performing, by the processing system, image pattern recognition on the eye image to determine a viewing angle of the user in the showroom, wherein the shopping parameters include the viewing angle of the user;
determining, by the processing system, that the user is seeking to purchase a product in the showroom according to the shopping parameters;
in response to the determining that the user is seeking to purchase the product, determining, by the processing system, an identity of the user by performing image pattern recognition of the another image of the user;
obtaining, by the processing system, user data of the user according to the identity of the user determined by the performing the image pattern recognition of the another image of the user;
analyzing, by the processing system, the user data;
selecting, by the processing system, interaction data from among a group of interaction data according to the analyzing of the user data;
providing, by the processing system, the interaction data to a computing device to enable the computing device to complete a purchase transaction with the user for the purchase of the product; and
completing, by the processing system through the computing device, the purchase transaction.
2. The method of claim 1, wherein the shopping parameters include an activity state of a communication device of the user, wherein the computing device is associated with a sales person at the showroom, and wherein the interaction data includes a price for the product, identification of an alternative product, identification of an accessory for the product, or a combination thereof.

3. The method of claim 2, further comprising:
providing, by the processing system, the interaction data to a display device of the showroom to cause the display device to present an advertisement associated with the interaction data.

4. The method of claim 1, wherein the shopping parameters further include a location of the user in the showroom.

5. The method of claim 1, further comprising determining, by the processing system, other preferences associated with other users, wherein the other users and the user are part of an online social network, and wherein the selecting of the interaction data is based on the other preferences.

6. The method of claim 1, further comprising determining, by the processing system, that the user has not purchased the product in the showroom, wherein the computing device is managed by an online entity that sells the product, and wherein the providing of the interaction data to the computing device is responsive to the determining that the user has not purchased the product in the showroom.

7. The method of claim 6, wherein the providing of the interaction data to the computing device includes providing metadata that describes an interaction of the user at the showroom associated with the product.

8. The method of claim 6, further comprising determining, by the processing system, that the user has purchased the product from the online entity and engaging in revenue sharing with the online entity according to a purchase transaction for the product.

9. The method of claim 1, further comprising adjusting, by the processing system, a configuration of the product according to an adjustment message sent from the system to the product to generate an adjusted product based on the interaction data.

10. The method of claim 1, wherein the determining the identity of the user and the obtaining the user data of the user both include communications with a communication device of the user and wherein the user data includes user preferences according to user input, a transaction history of the user, a media consumption history of the user, demographics of the user, or a combination thereof.

11. The method of claim 1, wherein the providing of the interaction data to the computing device includes providing bundling offers that identify services associated with the product, and wherein the services are provided by third parties.

12. A device comprising:
a processing system including a processor; and
a memory that stores executable instructions that, when executed by the processing system, facilitate performance of operations, comprising:
monitoring a user in a showroom to generate shopping parameters of the user, wherein the monitoring further comprises:
capturing image data of the user in the showroom, the image data that is captured including an eye image and another image of the user; and
performing image pattern recognition on the eye image to determine a viewing angle of the user in the showroom, wherein the shopping parameters include the viewing angle of the user;
determining that the user is seeking to purchase a product in the showroom according to the shopping parameters;
in response to the determining that the user is seeking to purchase the product, performing image pattern recognition of the another image of the user to determine an identity of the user, and obtaining user data of the user in response to the identity of the user that is determined;
analyzing the user data;
selecting interaction data from among a group of interaction data according to the analyzing of the user data; and
providing the interaction data to a computing device to complete a purchase transaction with the user for the purchase of the product.

13. The device of claim 12, wherein the shopping parameters further include an activity state of a communication device of the user, wherein the computing device is associated with a sales person at the showroom, and wherein the interaction data includes a price for the product, identification of an alternative product, identification of an accessory for the product, or a combination thereof.

14. The device of claim 13, wherein the operations further comprise:
providing the interaction data to a display device of the showroom to cause the display device to present an advertisement associated with the interaction data.

15. The device of claim 12, wherein the shopping parameters further include a location of the user in the showroom, eye-tracking data of the user in the showroom, or a combination thereof.

16. The device of claim 12, wherein the operations further comprise determining other preferences associated with other users, wherein the other users and the user are part of an online social network, and wherein the selecting of the interaction data is based on the other preferences.

17. The device of claim 12, wherein the operations further comprise determining that the user has not purchased the product in the showroom, wherein the computing device is managed by an online entity that sells the product, and wherein the providing of the interaction data to the computing device is responsive to the determining that the user has not purchased the product in the showroom.

18. The device of claim 17, wherein the providing of the interaction data to the computing device includes providing metadata that describes an interaction of the user at the showroom associated with the product.

19. The device of claim 17, wherein the operations further comprise determining that the user has purchased the product from the online entity and engaging in revenue sharing with the online entity according to a purchase transaction for the product.

20. A non-transitory machine-readable storage medium, comprising executable instructions that, when executed by a processing system including a processor, facilitate performance of operations, comprising:
monitoring a user in a showroom to generate shopping parameters of the user, wherein the monitoring further comprises:
capturing image data of the user in the showroom, the image data that is captured including an eye image and another image of the user; and
performing image pattern recognition on the eye image to determine a viewing angle of the user in the showroom, wherein the shopping parameters include the viewing angle of the user;
determining that the user is seeking to purchase a product in the showroom according to the shopping parameters;
in response to the determining that the user is seeking to purchase the product, identifying the user by performing image pattern recognition of the another image of the user;
obtaining user data of the user in response to the identifying the user;

analyzing the user data;
selecting interaction data from among a group of interaction data according to the analyzing of the user data; and
providing the interaction data to a computing device to complete a purchase transaction with the user for the purchase of the product.

* * * * *